Figure 1:
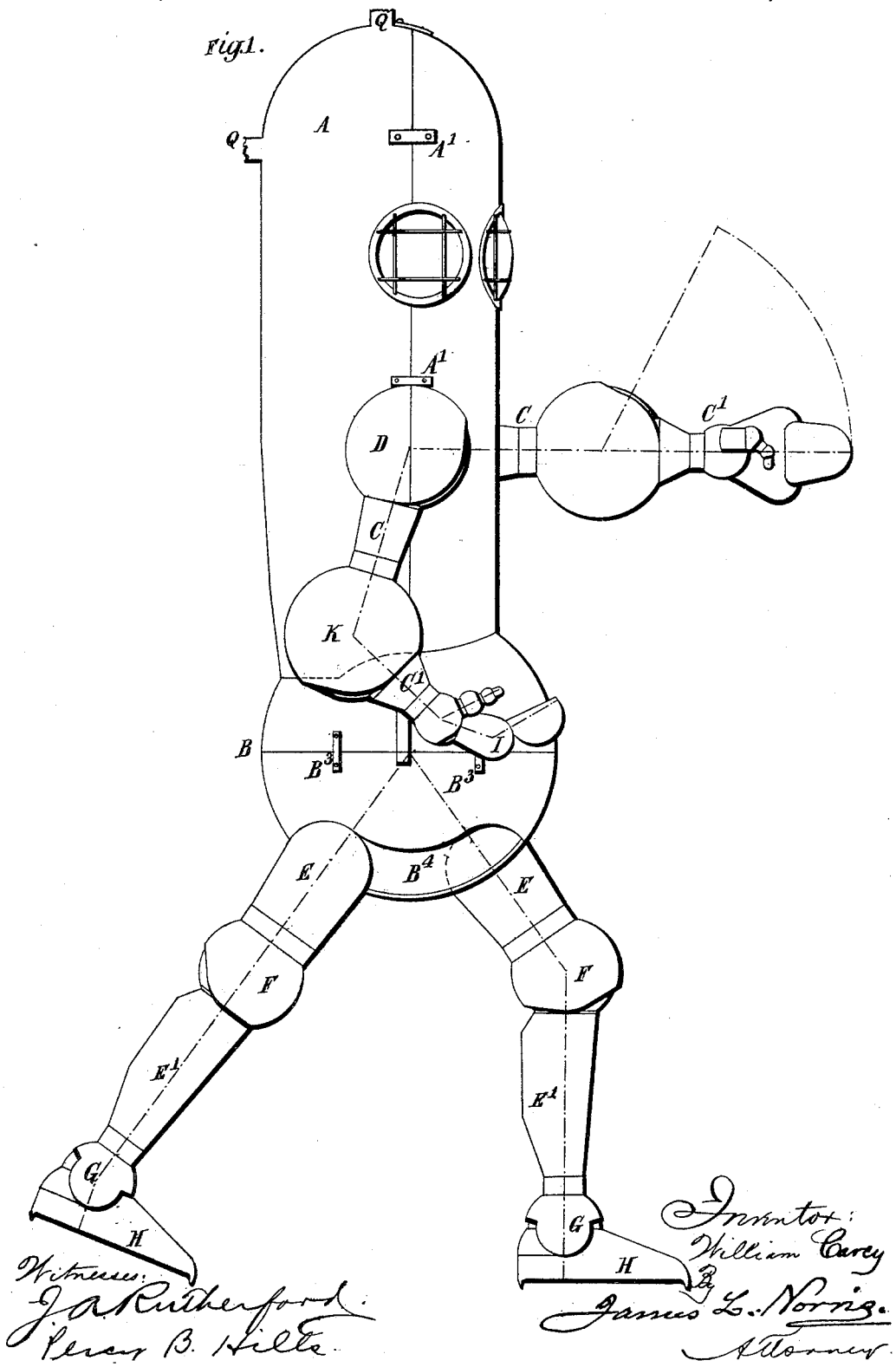

(No Model.) 19 Sheets—Sheet 1.

W. CAREY.
DIVING DRESS.

No. 462,202. Patented Oct. 27, 1891.

(No Model.) 19 Sheets—Sheet 4.
W. CAREY.
DIVING DRESS.

No. 462,202. Patented Oct. 27, 1891.

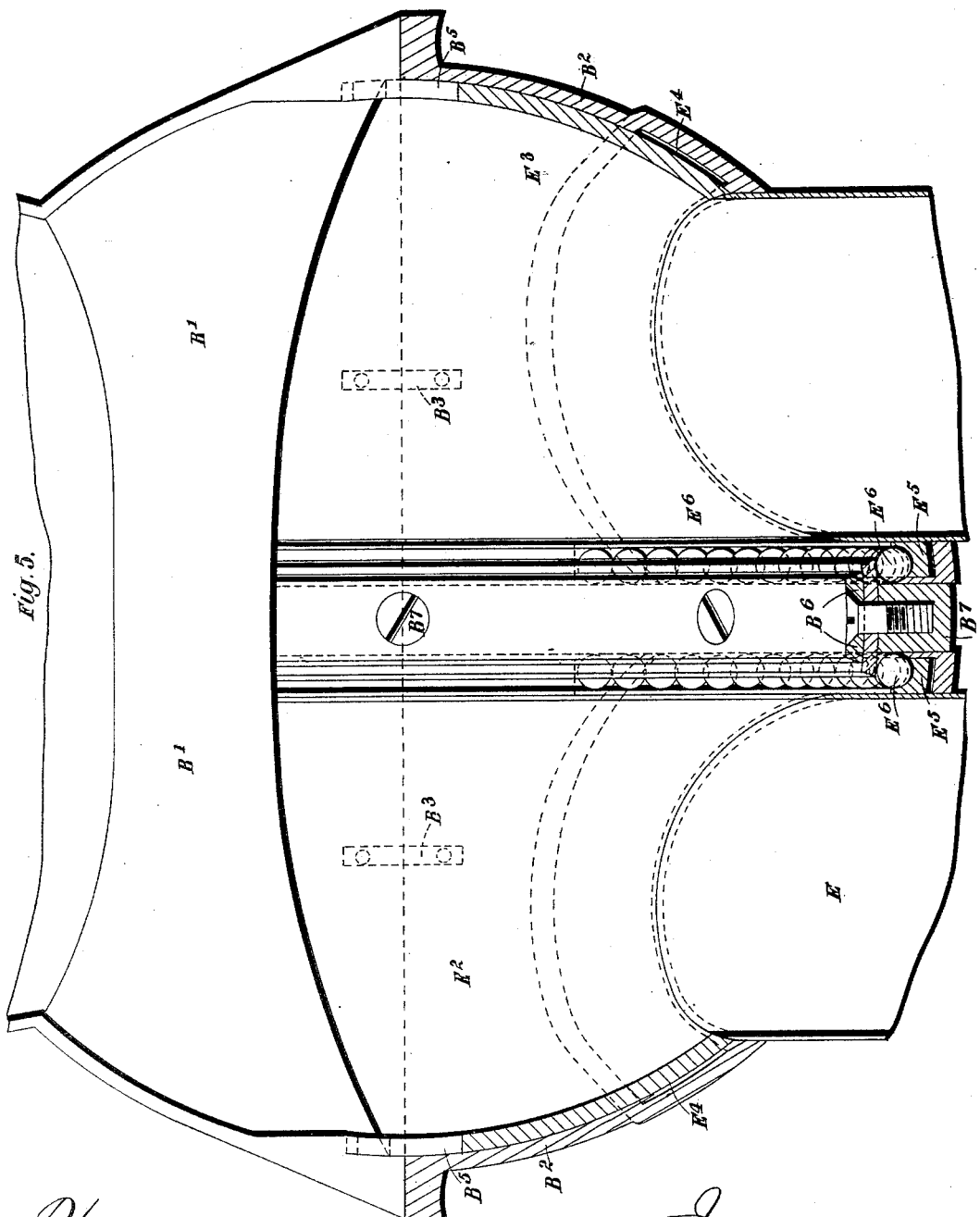

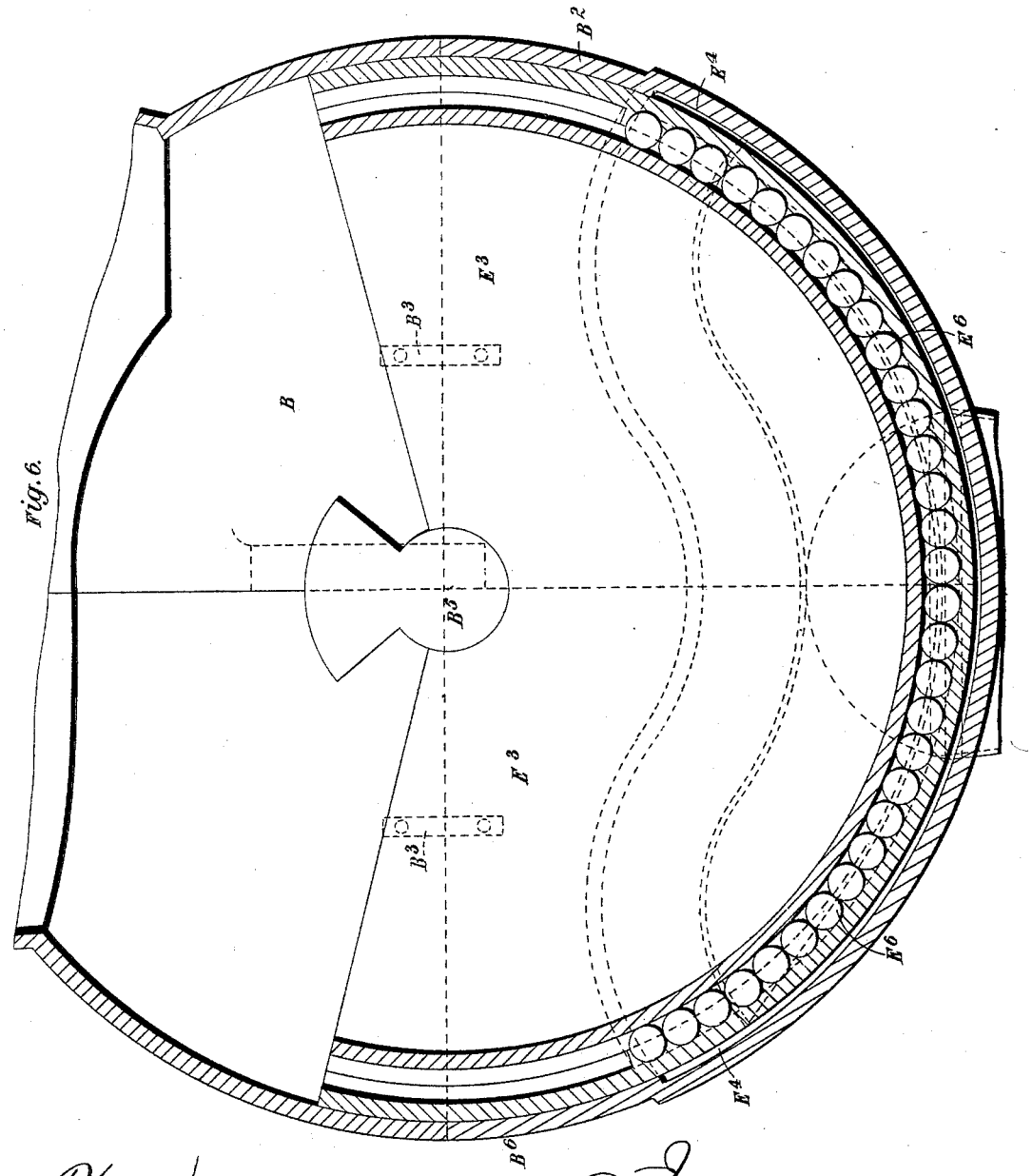

(No Model.) 19 Sheets—Sheet 7.
W. CAREY.
DIVING DRESS.
No. 462,202. Patented Oct. 27, 1891.
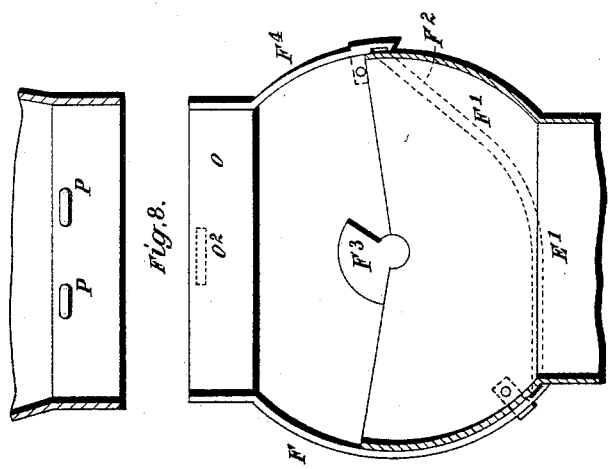
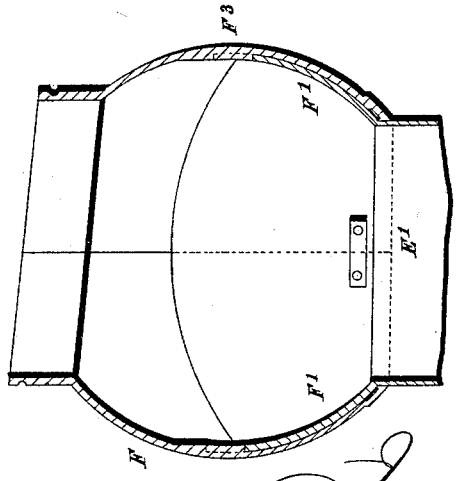

(No Model.)  W. CAREY.  19 Sheets—Sheet 8.
DIVING DRESS.
No. 462,202.  Patented Oct. 27, 1891.
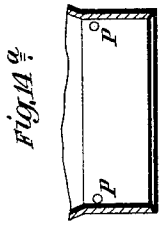
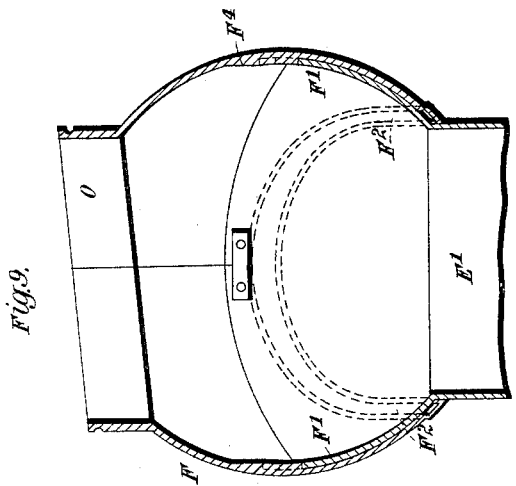

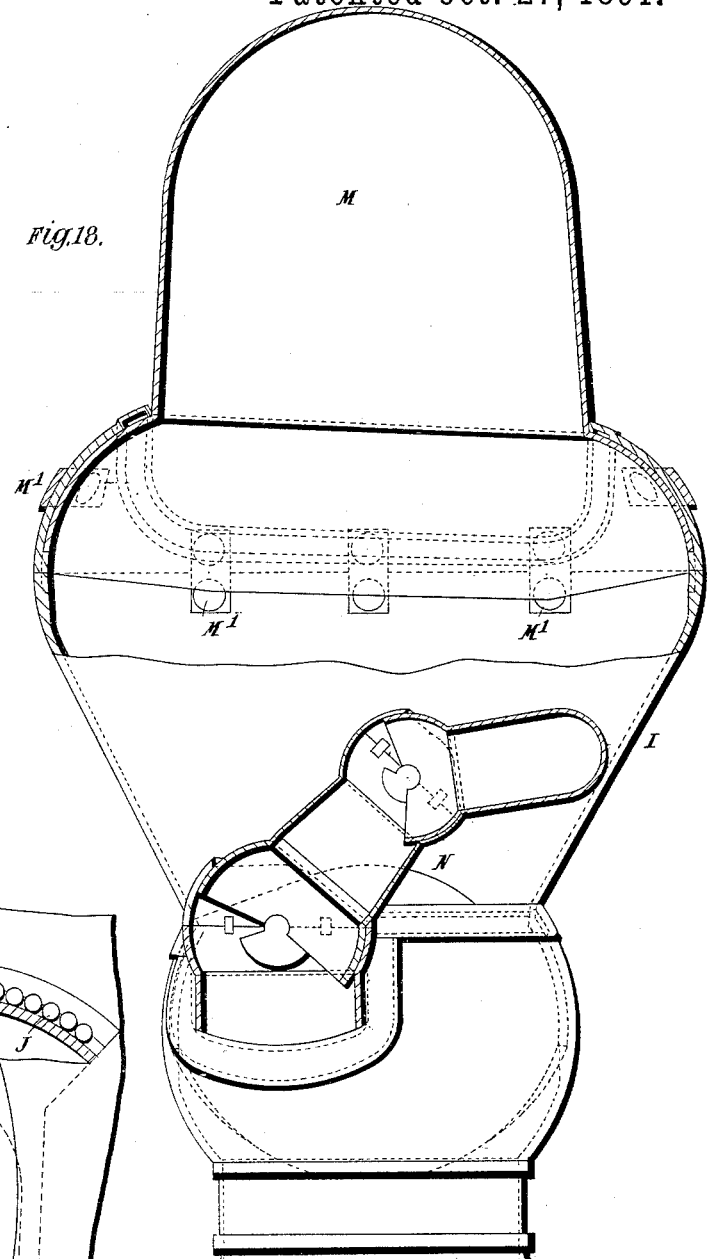

(No Model.) 19 Sheets—Sheet 10.
W. CAREY.
DIVING DRESS.
No. 462,202. Patented Oct. 27, 1891.
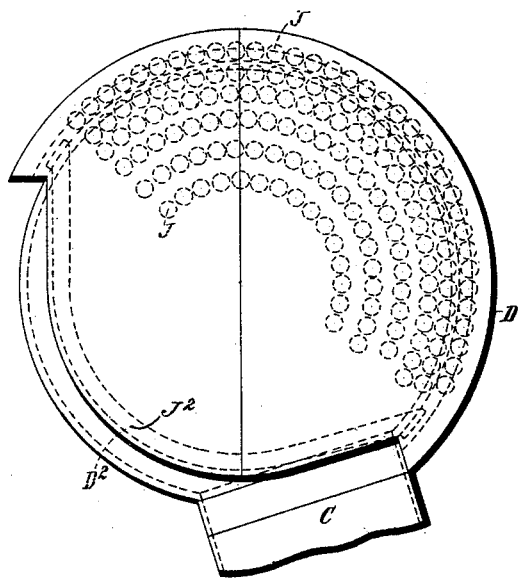
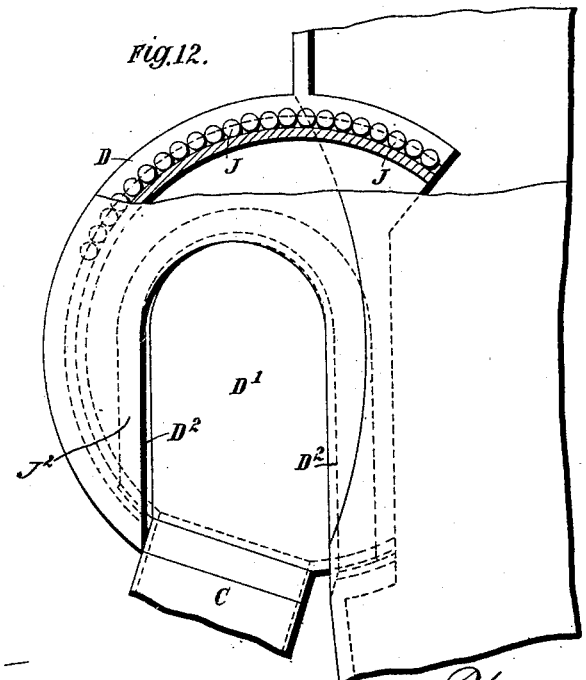

(No Model.) 19 Sheets—Sheet 11.

W. CAREY.
DIVING DRESS.

No. 462,202. Patented Oct. 27, 1891.

Witnesses:
J. A. Rutherford.
Percy B. Hills.

Inventor:
William Carey
By James L. Norris
Attorney (No Model.) 19 Sheets—Sheet 12.

W. CAREY.
DIVING DRESS.

No. 462,202. Patented Oct. 27, 1891.

Witnesses:
J. A. Rutherford.
Percy B. Hills.

Inventor:
William Carey.
By James L. Norris.
Attorney.

(No Model.) 19 Sheets—Sheet 13.
W. CAREY.
DIVING DRESS.

No. 462,202. Patented Oct. 27, 1891.

Witnesses:
J. A. Rutherford.
Percy B. Hills.

Inventor:
William Carey
By James L. Norris.
Attorney.

(No Model.) 19 Sheets—Sheet 14.
W. CAREY.
DIVING DRESS.

No. 462,202. Patented Oct. 27, 1891.

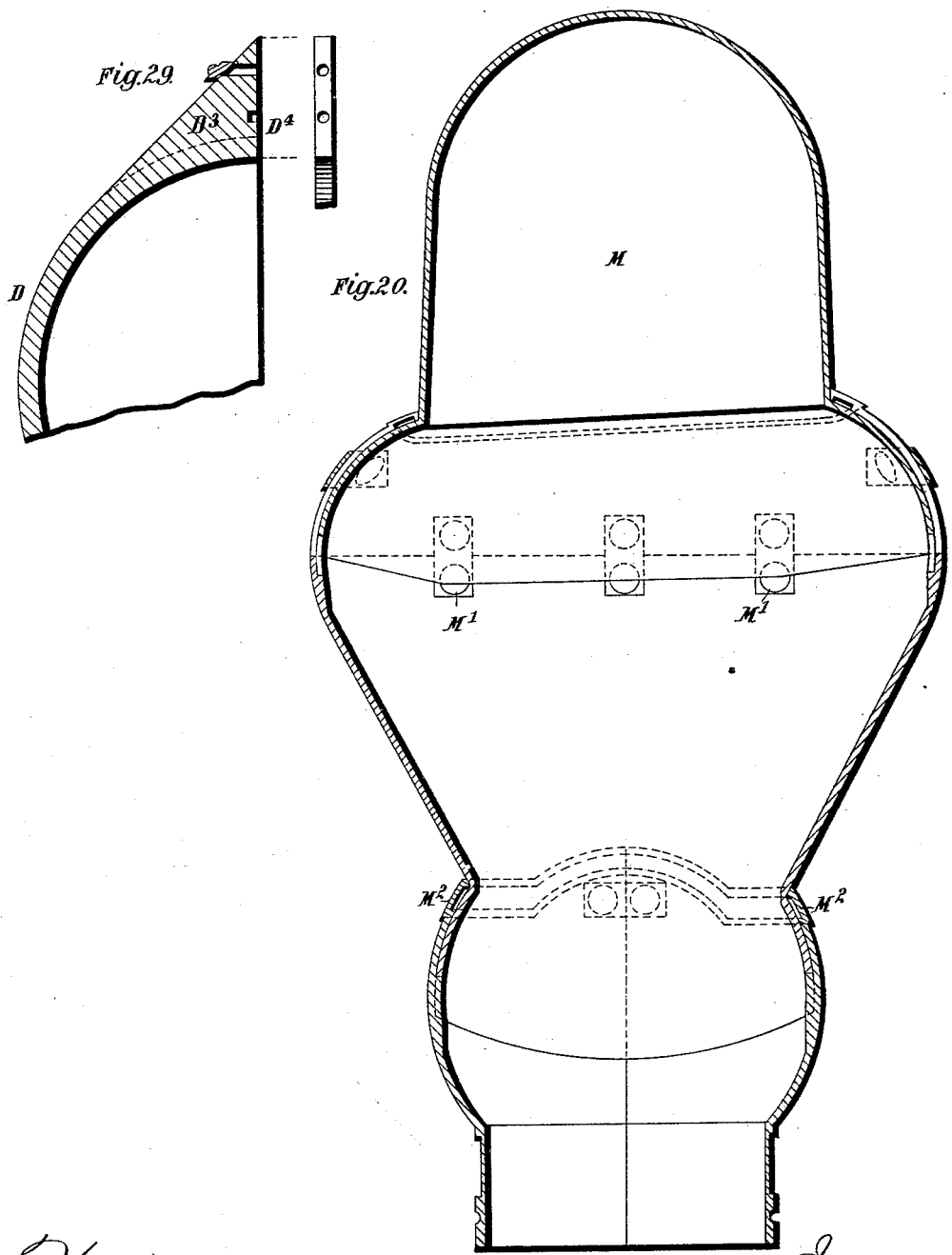

(No Model.)       W. CAREY.       19 Sheets—Sheet 16.
DIVING DRESS.
No. 462,202.       Patented Oct. 27, 1891.
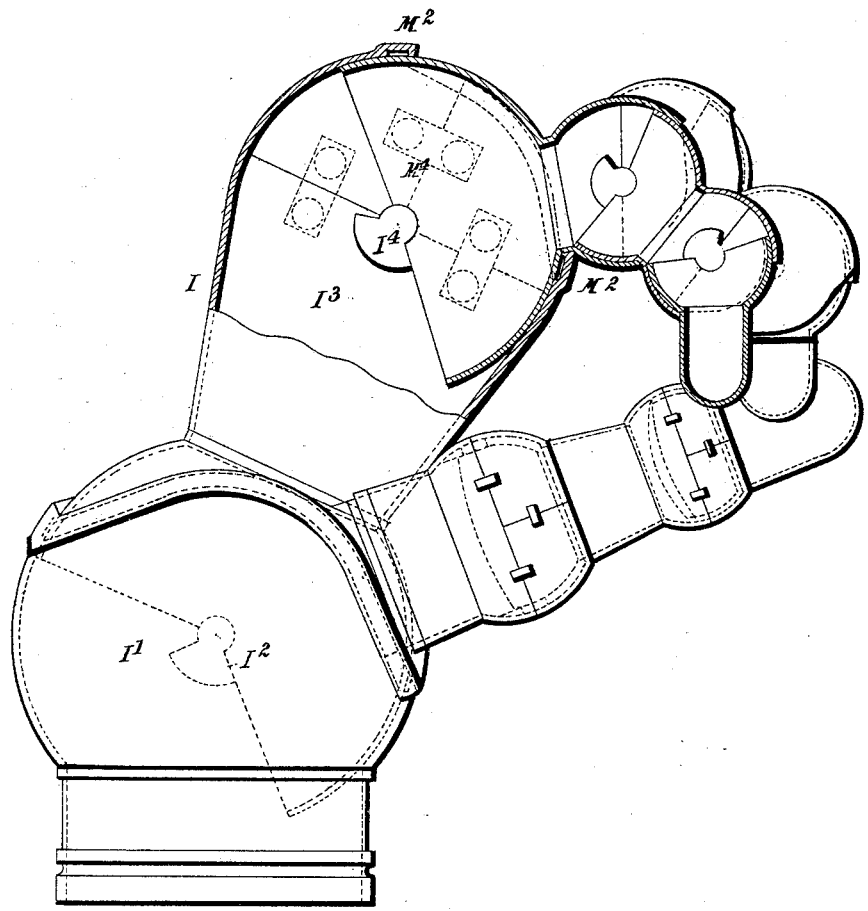

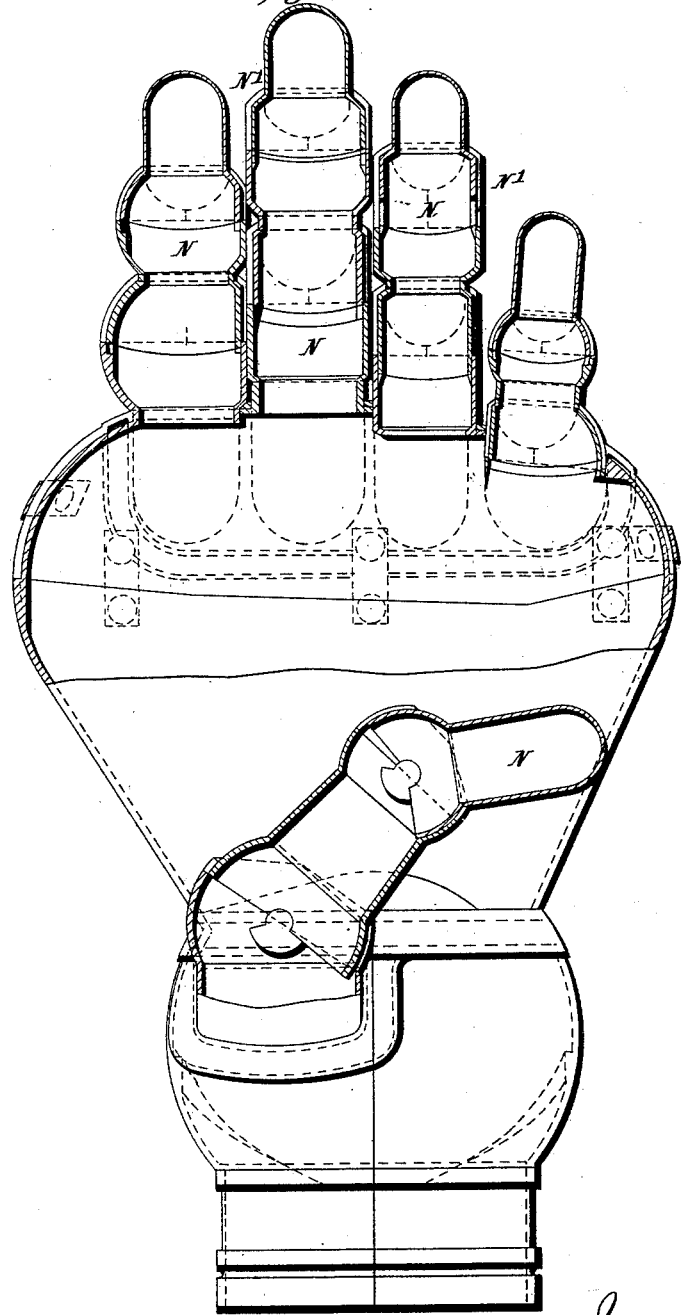

(No Model.)   19 Sheets—Sheet 18.

W. CAREY.
DIVING DRESS.

No. 462,202.   Patented Oct. 27, 1891.

(No Model.) 19 Sheets—Sheet 19.
W. CAREY.
DIVING DRESS.
No. 462,202. Patented Oct. 27, 1891.
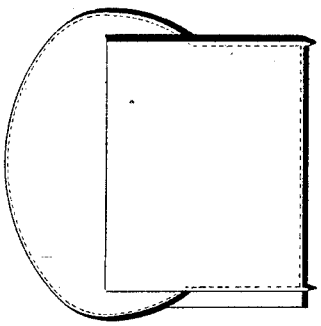
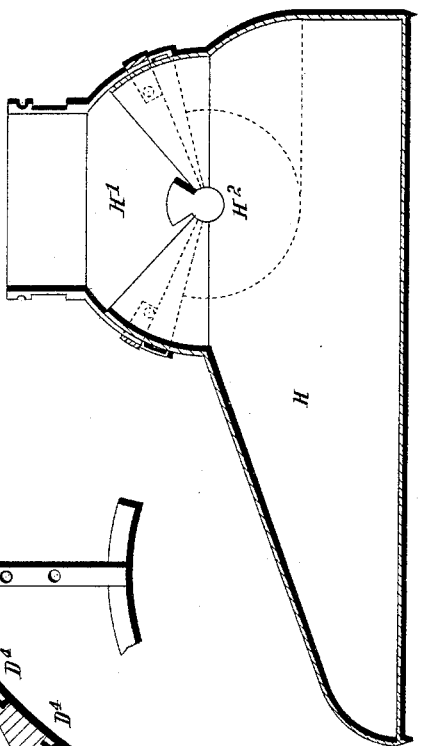
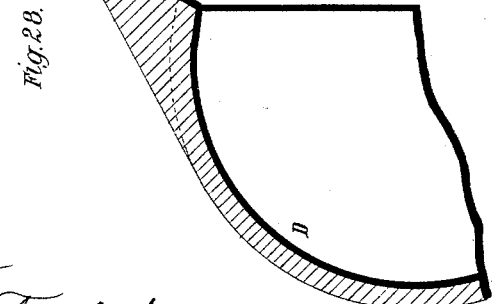
Witnesses:
J. A. Rutherford
Percy B. Hitle
Inventor:
William Carey
By James L. Norris
Attorney

UNITED STATES PATENT OFFICE.

WILLIAM CAREY, OF SOUTHAMPTON, ENGLAND.

DIVING-DRESS.

SPECIFICATION forming part of Letters Patent No. 462,202, dated October 27, 1891.

Application filed October 31, 1890. Serial No. 369,999. (No model.) Patented in England February 26, 1890, No. 3,083.

*To all whom it may concern:*

Be it known that I, WILLIAM CAREY, C. B., colonel Royal Artillery, a subject of the Queen of Great Britain, and a resident of Southampton, England, have invented certain new and useful Improvements in Diving-Dresses, (for which I have obtained a patent in Great Britain, No. 3,083, dated February 26, 1890,) of which the following is a specification, reference being had to the accompanying drawings.

My invention relates to diving-dresses, and is designed to improve the construction and increase the efficiency of the same.

Heretofore diving-dresses have usually been constructed in such a manner that when the diver is in the dress one or more additional weights are required to cause him to sink in the water. Moreover, such dresses have ordinarily been so made that the pressure of air within the diving-dress has had to be maintained equal to that of the water on the exterior of the dress. Consequently with the diving-dresses hitherto constructed the diver himself when working at great depths is subjected to very heavy pressure, the dress affording no protection to him in this respect, and the diver's movements in the water are greatly impeded by his dress and by the additional weight or weights used for causing the dress with the diver therein to descend in the water.

My present invention is designed to facilitate the carrying out of submarine operations—that is to say, to enable divers to work with safety at greater depths and for longer periods than has hitherto been practicable, and to move in the water with greater ease and comfort than heretofore. For this purpose I construct my improved diving-dress on the same principles as those on which the shell of the lobster or crab is formed. In other words, I so construct the diving-dress that the weight thereof with the diver in it will be equal or approximately equal to the weight of the water displaced thereby. Therefore my improved diving-dress, though sufficiently buoyant to float by itself on the surface of the water, will when the diver is in the dress be caused by his weight, in addition to its own, to sink in the water, provided the diver remains motionless. The diver can, however, by moving his limbs as required, rise in the water or travel through the same in any desired direction, the weight of the limb-casings being so proportioned that when either limb is raised by muscular action, the corresponding limb-casing will rise by its own buoyancy. Moreover, I so construct my improved diving-dress that it will withstand very high external pressure, thus obviating the necessity for introducing air under similar pressure into the dress. The pressure of the water is therefore borne not by the body of the diver, but entirely by the dress itself.

My diving-dress is made with peculiarly-constructed spherical joints, whereby the separate parts of the dress are united in such a manner that the diver can freely use his limbs, and which are so constructed that the outer spheres of the said joints, which are formed in separate halves or parts, will be firmly closed and held together by the external pressure of the water, and very light clasps or fastenings of any convenient shape or form will serve for retaining them in place when the diver is out of the water. Each of these spherical joints is so constructed and arranged that its axis or center is coincident or approximately coincident with the joint of the diver's body to which it corresponds.

Another feature of my said invention is the construction of the diving-dress in such a manner that the head-piece or helmet and the trunk or body portion extending to the stomach of the diver are or may be formed in a single piece, whereby a considerable increase in capacity is secured, and a storage of air is obtained sufficient to enable the diver to breathe for a considerable time in the event of injury to the air-tubes.

Another feature of my said invention is the arrangement of the inner spherical portion of the joint to work on pivots formed upon the interior of the outer spherical portion thereof, thus obviating the mechanical difficulties arising from the introduction of such pivots from the outside through a pivot-hole and the consequent liability to leakage and other defects.

My improved diving-dress may be constructed of aluminium, bronze, or other suitable metal or material of sufficient strength to resist the pressure of the water to which it is to be subjected. The limb-casings are also constructed to be buoyant or nearly buoyant, so that on the diver raising his hand, arm, or leg the corresponding limb-casing of the dress will rise or tend to rise by reason of its buoyancy, the diver being thus relieved from any strain in lifting or overcoming the weight of the same. The movements of the diver are thus greatly facilitated.

The water-pressure to be resisted, (which is of course dependent on the depth at which the diver is to work,) together with the metal selected, determines the thickness of the metal, which to insure the required buoyancy must be suitably proportioned for the different parts of the dress, being greatest in the largest part and least in the smallest tubular pieces forming the finger-tips of the glove hereinafter described.

My said invention, moreover, comprises other improvements hereinafter set forth.

In the accompanying drawings I have shown how my said invention may be conveniently and advantageously carried into practice.

Figure 2:
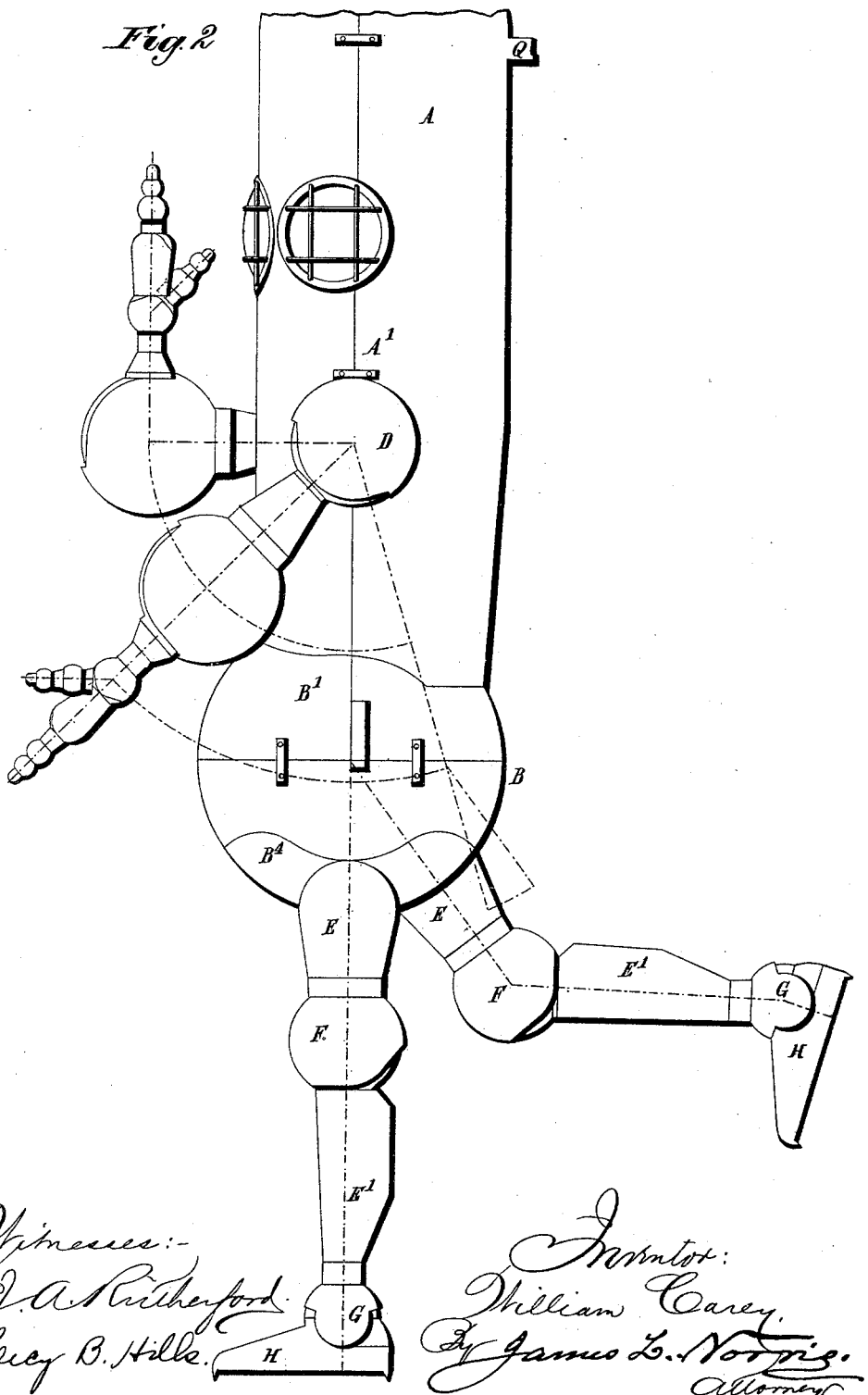
Figure 3:
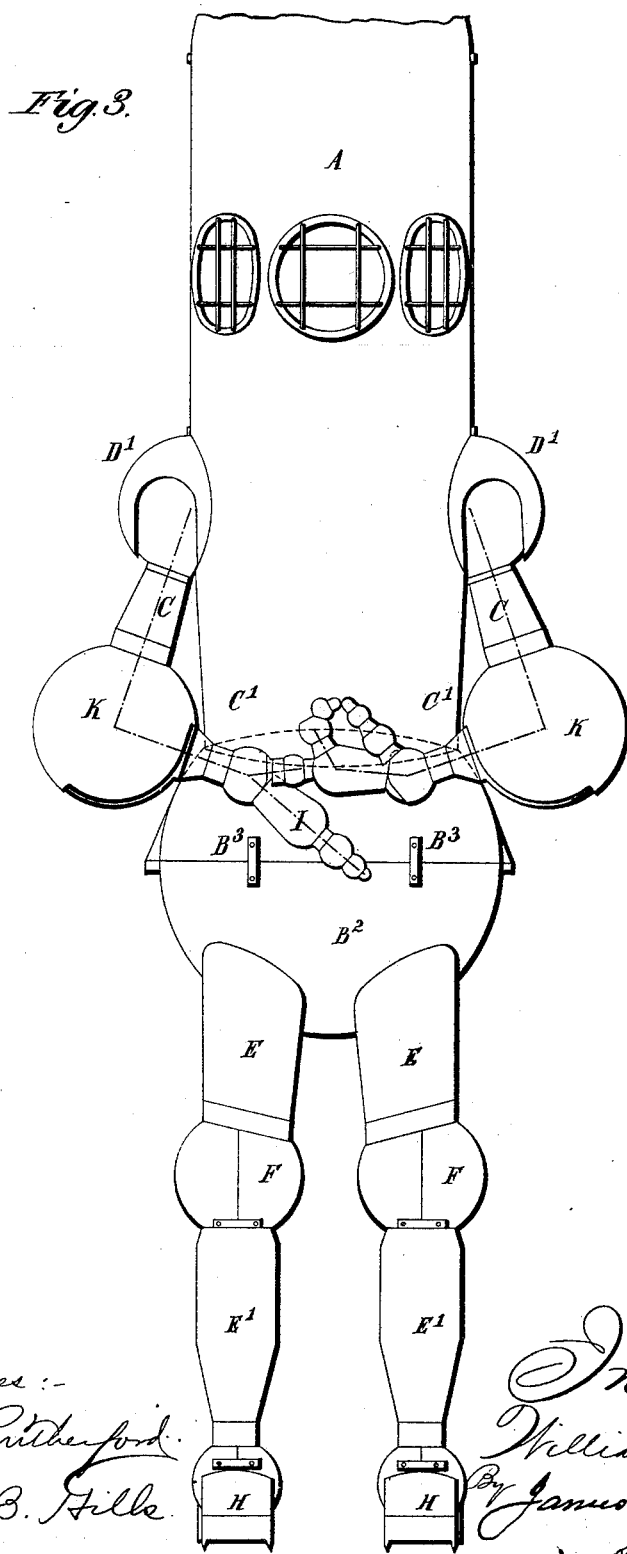
Figure 4:
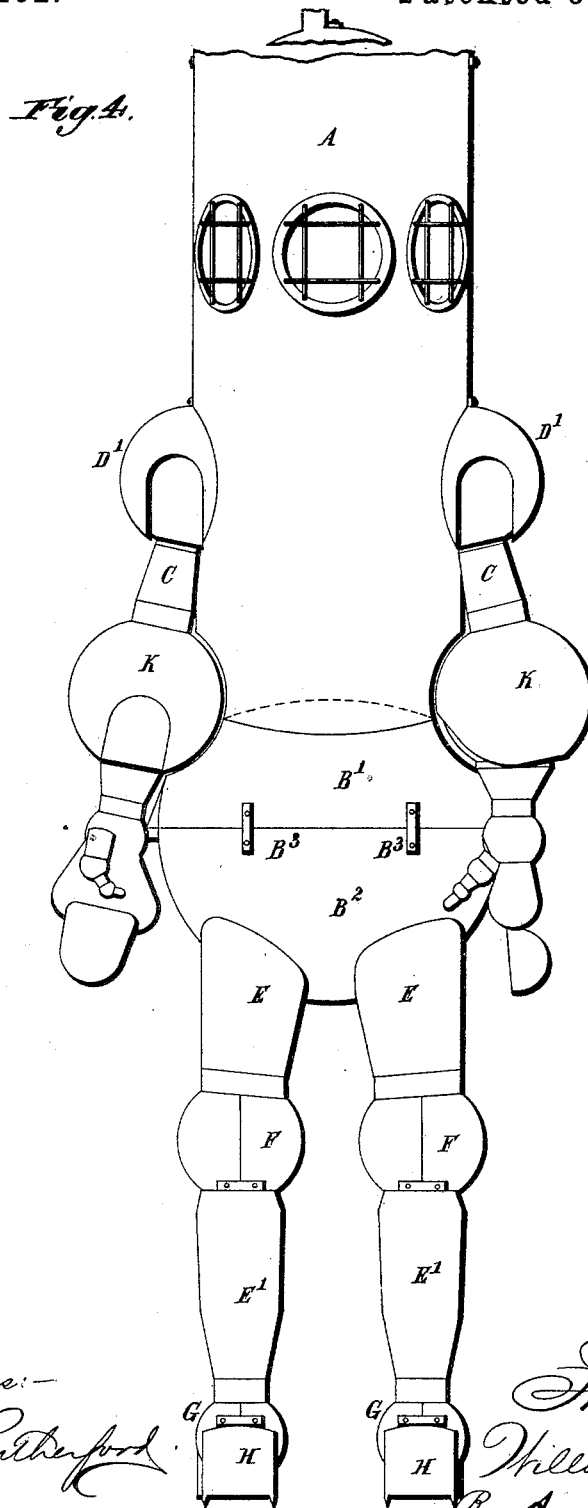
Figure 13:
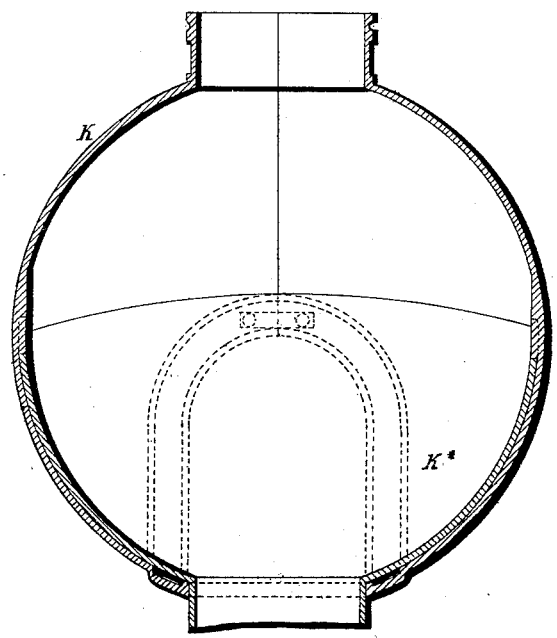
Figure 14:
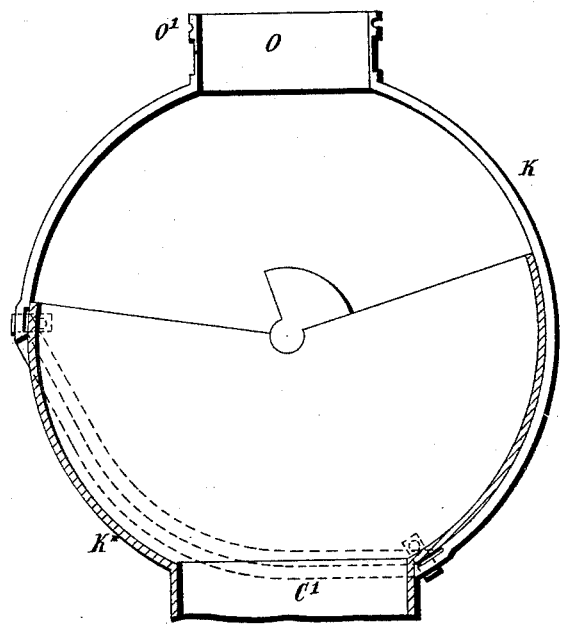

Figures 1 and 2 are side views showing my improved diving-dress in use and indicating the angles through which the limbs can be moved. Figs. 3 and 4 are front views of the said dress, showing the arms in different positions. Figs. 5 and 6 are vertical central sections of my improved diving-dress, the sections being taken on planes at right angles to each other. Figs. 7, 8, 8$^a$, and 9 show, respectively, front, side, and rear views of the knee-piece. Fig. 10 is a front view, and Fig. 11 is a side view, of the shoulder-piece by which the arm casing or cover is secured to the body of the dress. Fig. 12 is a side view of a shoulder-piece adapted to permit a different degree of play of the arm. Figs. 13, 14, 14$^a$, 15, and 16 are views of the elbow-joint, showing different arrangements of the same for a relative motion of sixty-three degrees or ninety degrees, respectively. Figs. 17 to 23 show views of different forms of a glove or hand-covering for use in connection with my improved diving-dress. Figs. 24 to 27 show views of the joint for the ankle with the boot attached. Figs. 28 and 29 show another form of shoulder-piece designed with the same object as those shown in Figs. 10 and 11.

A is the upper part of the diving-dress, which combines in a single suitably-shaped structure, preferably of cylindrical form, with a hemispherical top, the helmet, and body portion.

B is the stomach portion, which serves as a covering for the lower part of the body.

C C' are respectively the upper and lower arm-casings.

D D are the shoulder portions, which form parts of the joints whereby the arm-casings C are secured to the part A.

E E' represent, respectively, the upper and lower portions of the leg-covering, with which are combined a spherical knee-joint F and ankle-joint G, and a shoe H, attached to the said ankle-joint. I is a glove or hand-casing secured to the arm-casing C.

The upper or main portion A of the dress is preferably formed in halves, as shown in Figs. 1 and 2, the edges of which abut against each other and which are held together by suitable clasps A'. This construction is designed to facilitate the pulling on and the removal of the said main portion or body A, and may also be applied to the arm and leg casings and to other portions of the dress, the separate parts being united by butt-joints secured by clasps or the like in any convenient manner or form. The length of the said upper portion A may be diminished, if desirable, provided that the shape thereof be also at the same time varied so as to give the required buoyancy. This latter is preferably done by making the back of the dress elliptical both in vertical and horizontal sections.

The leg-coverings, composed of the upper and lower portions E E', are secured to the body of the dress, as shown in Figs. 1 to 4 and on an enlarged scale in Figs. 5 and 6, by means of spherical joints fixed in the stomach portion B, which portion is composed of a spherical flange of enlargement B' at the lower extremity of the body A, to which is secured by means of clasps or other suitable connections B$^3$ B$^3$ a hemispherical portion B$^2$, in which is fitted an inner sector of a sphere which is divided into two parts E$^2$ E$^3$. The leg-coverings E of the dress are secured, respectively, to these parts E$^2$ E$^3$.

To-and-fro motion of the legs is permitted by elongated openings or slots B$^4$, formed in the part B$^2$, the water being prevented from entering the said openings by the parts E$^2$ E$^3$ and by a water-proof lining E$^4$, of thin india-rubber or other elastic and suitable material, between the inner and outer parts of the joints, the portions E$^2$ E$^3$ working on the pivots B$^5$. To diminish the friction between the parts E$^2$ E$^3$ and the portion B, as well as to prevent the said parts being thrust inward by the water-pressure, I secure within the latter between the said parts a semicircular roller-path B$^6$ by means of suitable studs or screws or screw-bolts B$^7$, and I form upon the adjacent edges of the parts E$^2$ E$^3$ suitable roller-paths E$^5$, and I place between the said roller-paths, as shown, in cup-shaped recesses formed therein a series of balls E$^6$. These balls are free to rotate upon their axes each in its own recess independently of one another during the motion of the parts and serve to supplement the aforesaid pivots B$^5$.

The knee-joint F (more clearly shown in Figs. 7 to 9) is a spherical joint comprising an outer portion F$^4$, secured upon the upper or thigh covering, and an inner spherical portion F', secured upon the lower part of the leg-casing. The slot or opening F$^2$ is carried up at the rear of the said joint, as in Fig. 8, to permit the bending motion of the leg. The inner part F' of the joint bears upon a pivot F³, preferably formed integrally upon the interior surface of the part F⁴, motion of the two parts relatively to one another being thus permitted. The ankle is in a similar manner provided with a spherical joint, by which it is connected to the foot-covering or shoe, H which may be of any convenient form.

Each of the shoulder-pieces D, which are of spherical form, serves as the outer portion of a spherical joint, by which the upper portions C of the arm-casing are united to the trunk of the dress A. One-half of these shoulder-pieces may be secured to or formed upon each of the halves of the body of the diving-dress or be made separate and secured to the body and to the brackets D³, Figs. 28 29, the two halves of the said shoulder-piece being caused to inclose an inner sector of a sphere D', as shown on an enlarged scale in Figs. 10 to 12. D² is a slot, channel, or opening of suitable dimensions formed, as shown, in the outer portion of the joint to permit the motion of the arm casing C and to allow of the diver moving his arm to and fro. Water is prevented from entering this slot or opening by the spherical sector D', which is of sufficient extent to close the same in whatever position the arm C may be moved in the slots D². To diminish the friction between the fixed and movable parts of the joint a number of rollers or balls J are provided, as shown, which are arranged between the same and rotate during the relative motion of the parts. The clearance between the outer and inner spherical portions of the joint is made water-tight by means of a thin layer of india-rubber or the like placed in a recess or groove J' in the outer portion of the joint or otherwise secured thereto. The projection or enlargement D' is preferably secured to the arm-casing C by means of a joint, which will allow of the motion of the arm-casing around its axis while holding the same securely upon the said projection. This joint, as all others, is designed on the principles laid down in the specification of my British Letters Patent No. 4,467, of 1890, which joint was invented when designing this dress, and which principles they one and all severally contain in a more or less degree according to the particular work required of them.

When the outer shoulder-coverings are made separate from the body or for the purposes of securing the shoulder-pieces more firmly to the dress and for supporting the strains thereof, I sometimes provide the said shoulder-piece with projections D³, as shown, Figs. 28 and 29, which are clamped to the body of the dress and serve as brackets or supports. The said piece D³, where it is secured to the dress, is provided with recesses or perforations D⁴, into which suitable pins or bolts projecting from or through the body of the dress are adapted to enter.

Figure 15:
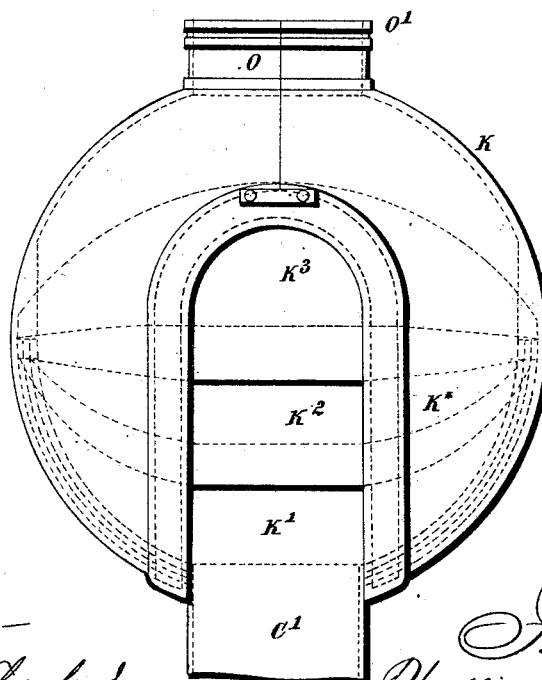
Figure 16:
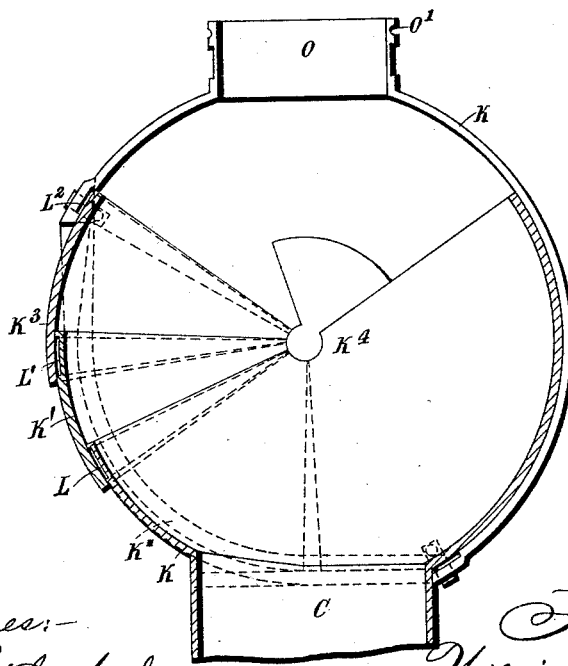
Figure 17:
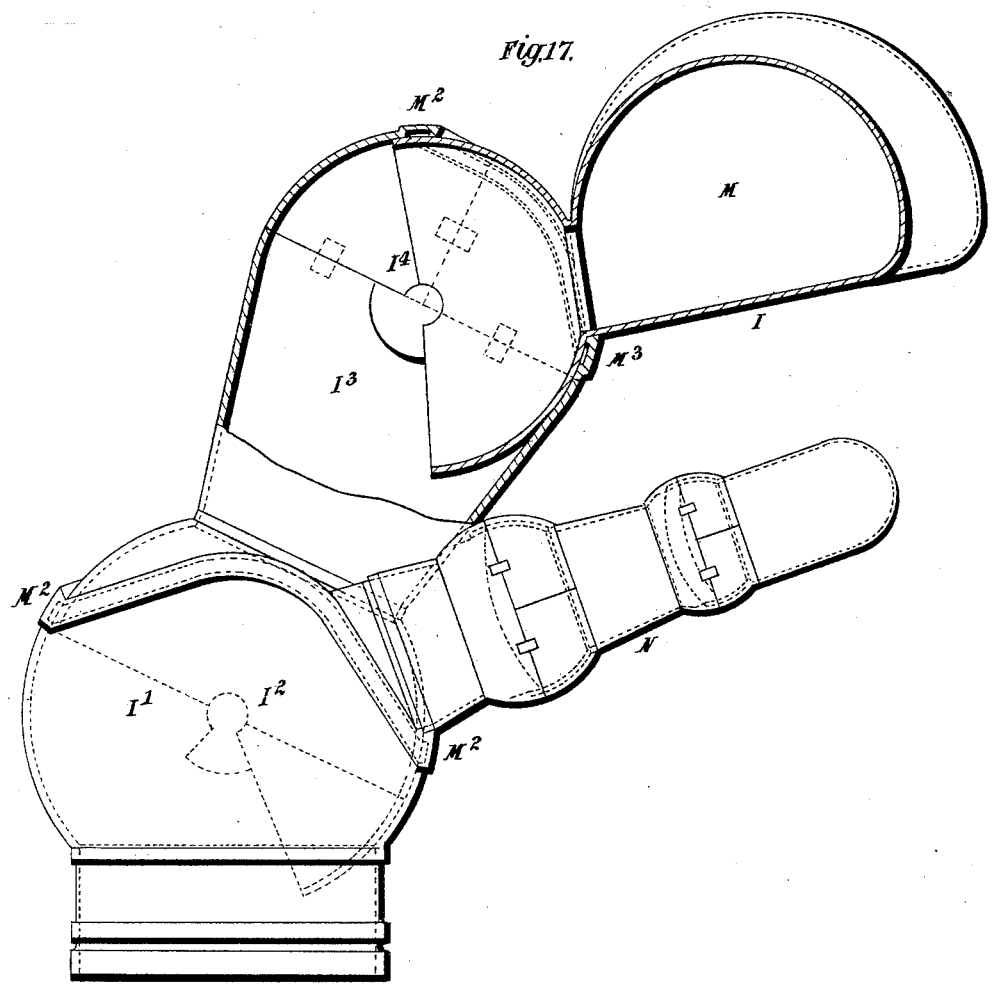
Figure 19:
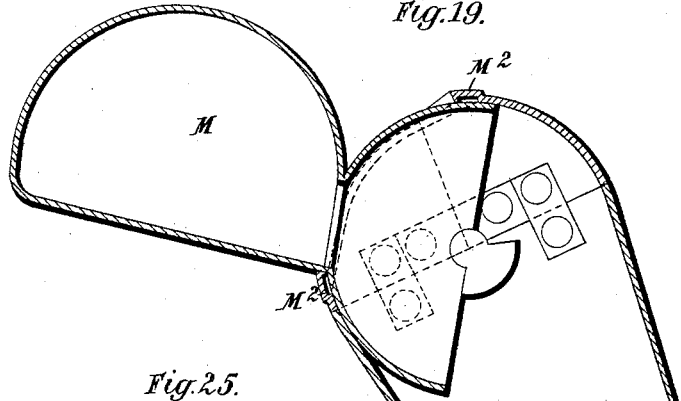
Figure 25:
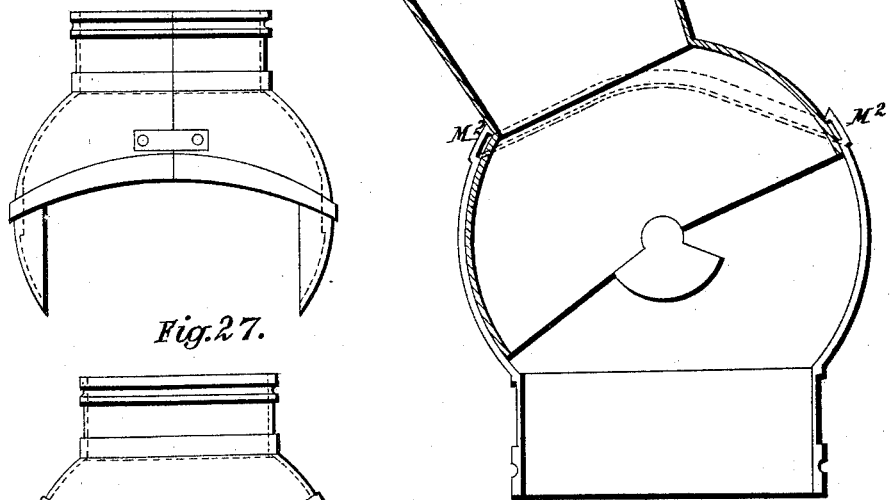
Figure 27:
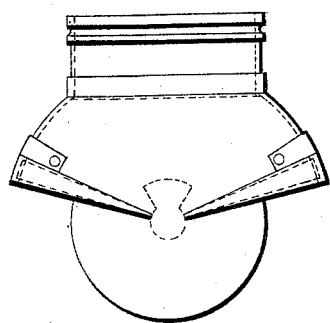

The elbow-joint K of the arm-casing G (shown in Figs. 13 to 16) and the joints of the wrist and of the fingers of the glove I are all formed by inclosing within a spherical enlargement on one of the parts to be connected a similar but smaller spherical flange or enlargement on the other part somewhat resembling the improved coupling described in the aforesaid specification. By varying the size of the opening or slot in the outer sphere of the joint the extent of motion of the one part relatively to the other either in a forward or lateral direction may be varied as desired. Thus in Figs. 13 and 14 the dimensions of the slots or openings K* are such as permit the parts to move relatively to one another through an angle of about sixty degrees, while in Figs. 15 and 16 I have shown a special arrangement of elbow-joint to permit about ninety degrees of motion. In this latter case the inner portion of the spherical joint, instead of being composed like the joint of the shoulder-piece D, (shown in Figs. 11 and 12,) is formed of one or more sectors of spheres K' K² K³, working on a common pivot K⁴, fitting one within the other, as shown, and provided at their edges with recesses L L' L², filled with thin india-rubber or other suitable elastic material secured, preferably, in the said recesses or in any other convenient manner for the purpose of forming a water-tight joint between the sectors. The sectors slide one over the other when the arm is moved and so permit of a considerable degree of motion without forcing the upper segment K³ against the arm of the diver, suitable stops or projections being provided to limit the motion of the said sectors. In the hand-covering or glove shown at I in Figs. 17 to 20 provision is made for allowing of the motion of the wrist-joint by means of the spherical joint I', pivoted at I². The casing of the thumb is likewise provided with similar joints to permit the motion thereof, there being a joint in the casing corresponding with each joint in the thumb. The palm of the hand is inclosed in a portion I³, which moves around the pivot I² and is provided at its other extremity with a spherical joint, as shown, the pivot of the said joint being shown at I⁴. This joint carries a casing or shell M, which is adapted to inclose the fingers, the back of this shell or casing answering to the back of the fingers being of an arched or domed form, as shown in the drawings, which permits of the fingers being moved therein to prevent cramp, besides adding considerably to the strength of and giving buoyancy to the casing. To facilitate the putting on of the glove or hand-cover the same is formed, preferably, in sections secured together by suitable clasps M', while suitable recesses M² are provided around the edges of the openings in the spherical joints filled with india-rubber or other elastic material.

Figure 23:
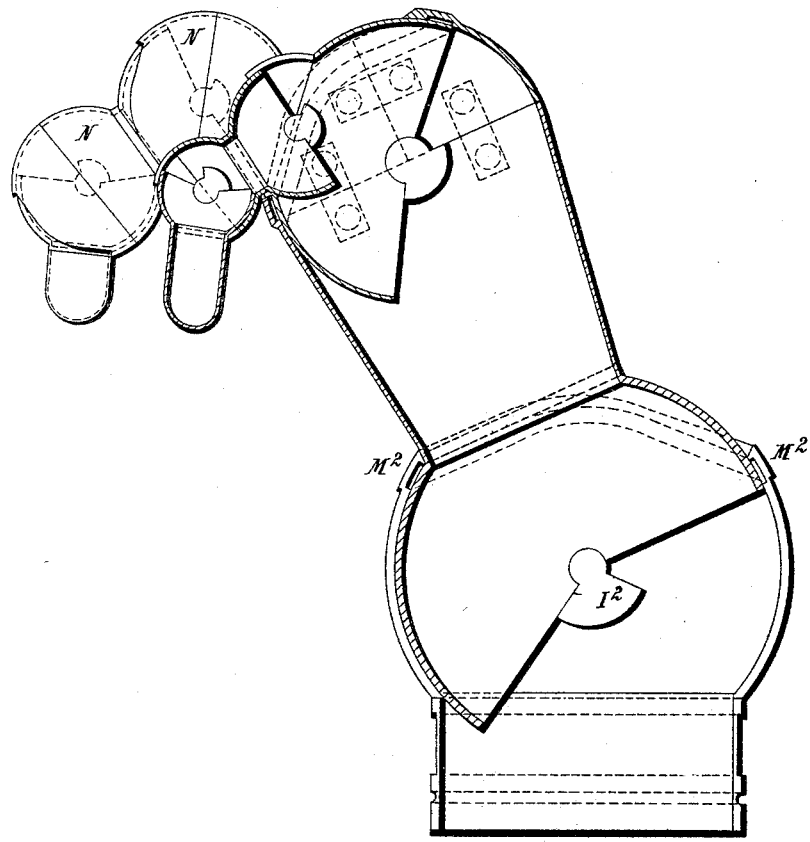

In Figs. 21 to 23 I have shown a form of my improved hand-covering wherein each of the fingers is provided with a separate and independent covering or casing N, constructed with joints corresponding with the joints of the fingers, resembling that of the thumb. (Shown in Figs. 17 to 20.) These joints are constructed in a similar manner to the spherical joints hereinbefore described, but differ from them in being provided with flattened sides N', as shown, to obviate the difficulty which would exist with complete spheres by reason of the large amount of space they would occupy between the fingers. Figs. 21 and 23 show the glove or hand-covering in its closed position—that is, in the position for grasping or taking hold of articles. The hammers and other tools used by the divers are preferably provided with enlarged or specially-formed handles to correspond with the shape of fingers and to facilitate the grasping of the same by the hand-covering.

Turning or twisting motion of the casings or coverings connected by the spherical joints is provided for where necessary by forming the connection between the spherical joints and the parts to which they are secured in such a manner as to permit the rotation or partial rotation of the same relatively to one another. This is preferably attained, as indicated in connection with the elbow-joints, by connecting the parts by a tubular piece O, formed on or firmly secured to the spherical joint and adapted to enter the extremity of the portion of the covering or casing C which is to be secured thereto. An annular groove O' is formed, respectively, upon the tubular piece O and upon the interior of the casing to be connected therewith. Two holes or perforations P P permit the insertion of a suitable pin or the like through the said holes tangentially into the said annular grooves, thus securely locking the casing and the tubular portion together, while permitting of their rotation relatively to one another.

In the knee-joint shown in Figs. 7, 8, and 9, since relative turning motion of the parts is not necessary, the pin or the like by which the joint is connected to the thigh-covering is passed through the two holes P P, Fig. 8ª, in the extremity of the said thigh-covering and enters the short slot or groove O² in the cylindrical piece O, Fig. 8.

The shoe H (shown in Figs. 24 to 27) is secured to a joint H', of the kind hereinbefore described, pivoted at H² to the lower portion of the leg-casing E', and serves to relieve the foot of water-pressure.

Balls or rollers for supporting the movable parts may be used in all joints where the inner sectors cannot be conveniently supported by pivots or where it is desired to diminish the friction of the moving parts, the said balls being employed in a manner substantially similar to that described for the shoulder and hip joints or stomach portion of the dress. The limb of the dress is thus able to resist the water-thrust without the friction of the simple ball-and-socket or spigot joint.

The outer spherical portions of the joints are preferably formed in halves secured together by suitable clasps or by an annular or zone-like metal band adapted to fit around the same and held in position by means of pins or otherwise.

The great pressure of the water tends to keep everything in position and sets up an amount of friction sufficient to prevent any lateral displacement of one part relatively to another and, further, insures freedom from leakage.

The water-proof arrangement for the joints consists of an elastic substance placed and secured on or in one of the bearing-surfaces of the said joint, a slightly greater thickness of india-rubber or other elastic material being inserted in the clearance-space between the working and bearing surfaces than is absolutely needed to fill the same, thus insuring the closing thereof and preventing the passage of fluid through the same. The pressure to insure this may be so slight as not to exceed a few ounces on the square inch and need not be such as to interfere with the working of the joint through setting up unnecessary friction.

Air is supplied to the diver by means of the pipes Q Q, one of which serves to admit air to the interior of the diving-dress, while the other serves to convey the waste air therefrom. These pipes may be arranged as shown in Figs. 1 and 2 or otherwise, as may be found convenient, so as to allow of a continuous circulation of air to the diver. Ordinary air-tubing will be found sufficient for use in shallow water; but when the diver descends to depths at which the external water-pressure on these air tubes or pipes is greater than the normal air-pressure supplied the said tubing will gradually close or collapse, thus cutting off the air-supply. To prevent risk of this kind, pipes of metal or other material sufficiently strong to resist such outward pressure must be employed, and such pipes being preferably constructed substantially in the manner set forth in the specification of my British Letters Patent No. 4,467, of 1890. Thus as all pressure of the water is borne by the diving-dress and by the said pipes it is not necessary to supply air at a high pressure, and the diver is relieved from all inconvenience arising either from the pressure of the water or from the pressure of the air, and a constant supply of air at the ordinary atmospheric pressure is insured, and as such metal tubing is made buoyant weight may be discarded as an obstacle to the diver's movements. Further, instead of supplying air to the diver, as before said, a suitable apparatus for renovating the air as breathed by chemical means or otherwise may be carried in the body or back of the dress by increasing the size thereof, and so providing the increased buoyancy necessary to overcome the extra weight of the said air-renovating apparatus, by which means all connection with a vessel on the surface of the water by air-tubing may be dispensed with and all inconvenience and impediment arising from the use of air-tubing to the movements of a diver will also be obviated and in fact entirely removed.

The improved diving-dress constructed substantially as described will by its buoyancy enable a diver to work in deep water without experiencing inconvenience by reason of the pressure, and will, moreover, enable the diver to move and swim as freely as a lobster, crab, or other shell-fish, and will be water-tight in all its parts.

What I claim is—

1. A diving-dress wherein the relatively movable parts are connected by spherical joints, the centers of motion of which are approximately coincident with those of the corresponding joints of the diver's body, and each of which consists of an interior sphere connected to a tubular part of the dress and working in an exterior sphere divided longitudinally to admit the interior sphere, substantially as hereinbefore described.

2. A diving-dress wherein the relatively movable parts are connected by joints, each consisting of an interior sphere attached to a tubular part of the dress and working in a longitudinally-divided exterior sphere having an elongated slot, in which works the said tubular part of the dress, substantially as described.

3. A metal diving-dress wherein the body-casing and helmet consist of a cylindrical or approximately cylindrical portion divided longitudinally and extended above the head of the wearer so as to make the entire dress with the diver therein of approximately the same specific gravity as water, and wherein each limb-casing is made up of pieces divided longitudinally and so proportioned in respect of their capacity and weight that they are of approximately the same specific gravity as water, the relatively movable parts being connected by spherical joints, substantially as described, whereby the diver, when under water, can move his body and limbs freely, as above specified.

4. A metal diving-dress constructed with spherical joints, substantially as described, and having the outer portions thereof formed in halves, the edges of which bear against each other, so that the pressure of the water will keep them tightly together, and clasps or fastenings for uniting the halves of such portions of the dress, substantially as and for the purposes set forth.

5. A diving-dress wherein the limb-casings are united to the body-casing by means of spherical joints provided with anti-friction rollers or ball-bearings, substantially as and for the purposes set forth.

6. A diving-dress wherein the relatively movable parts are connected by spherical joints having solid internal pivots, as and for the purposes above specified.

7. In a diving-dress, a spherical joint comprising a slotted outer sphere secured to one part of the dress and an inner sector of a sphere pivoted in the outer sphere and secured to another part of the dress, which works in the slot in the said outer sphere, substantially as and for the purposes set forth.

8. A diving-dress in which, for the purpose of reducing the water pressure or thrust on the movable portion of the joint of each limb, with due regard to the capability of flexible motion of this limb, each limb-casing is arranged to work in an elongated opening or slot in the outer covering of the joint, substantially as set forth.

9. In a diving-dress, a spherical joint of the character hereinbefore described, provided with pivots or ball-bearings for the purpose of diminishing the friction between the moving parts, substantially as set forth.

10. A diving-dress comprising spherical joints, each consisting of an interior sphere attached to a tubular part of the dress and working in a longitudinally-divided exterior sphere having a cylindrical extension at one side and an elongated slot at the other side, in which works the said tubular part of the dress, and a cylinder secured upon the said extension in such a manner that it can be turned thereon, substantially as and for the purposes above specified.

In testimony whereof I have hereunto signed my name in the presence of two subscribing witnesses.

WILLIAM CAREY.

Witnesses:
CHAS. B. BURDON,
ALBERT EDWARD NIXON.